United States Patent
Newberg et al.

(10) Patent No.: US 12,177,096 B2
(45) Date of Patent: Dec. 24, 2024

(54) SPEED BOOST FOR ELIGIBLE USER EQUIPMENT ON A LOCAL AREA NETWORK

(71) Applicant: Charter Communications Operating, LLC, St. Louis, MO (US)

(72) Inventors: Shane Newberg, Aurora, CO (US); Christopher Teague, Castle Pines, CO (US); William K. Logan, Overland Park, KS (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/408,957

(22) Filed: Jan. 10, 2024

(65) Prior Publication Data
US 2024/0214284 A1 Jun. 27, 2024

Related U.S. Application Data

(63) Continuation of application No. 18/086,042, filed on Dec. 21, 2022, now Pat. No. 11,909,605.

(51) Int. Cl.
*H04L 41/50* (2022.01)
*H04L 41/0896* (2022.01)

(52) U.S. Cl.
CPC ........ *H04L 41/508* (2013.01); *H04L 41/0896* (2013.01)

(58) Field of Classification Search
None
See application file for complete search history.

(56) References Cited

U.S. PATENT DOCUMENTS

| 8,565,263 B2 | 10/2013 | Scarborough |
| 2008/0310407 A1 | 12/2008 | Sewall et al. |
| 2010/0299236 A1 | 11/2010 | Cassell et al. |

OTHER PUBLICATIONS

Non-Final Office Action for U.S. Appl. No. 18/086,042, mailed Jun. 29, 2023, 10 pages.
Notice of Allowance and Notice of Allowability for U.S. Appl. No. 18/086,042, mailed Oct. 13, 2023, 7 pages.

*Primary Examiner* — Brian Whipple
(74) *Attorney, Agent, or Firm* — Dority & Manning, P.A.

(57) ABSTRACT

A method for providing a differentiated feature to a first user equipment (UE) connected to a local area network (LAN) implemented by a router connected to a customer premises equipment (CPE) provisioned with a default feature associated with a first service tier of a plurality of service tiers provided by an internet service provider includes obtaining data indicating the first UE has connected to the LAN and determining the first UE is eligible for a second service tier of the different tiers. In response to determining the first UE is eligible for the second service tier, the method includes causing the CPE to be dynamically provisioned for a differentiated service associated with the second service tier. The method includes sending a message to the router to configure the router to provide the differentiated feature to the first UE.

20 Claims, 5 Drawing Sheets

SPEED BOOST FOR ELIGIBLE USER EQUIPMENT ON A LOCAL AREA NETWORK

RELATED APPLICATION

This application is a continuation of co-pending U.S. patent application Ser. No. 18/086,042, filed on Dec. 21, 2022, entitled "SPEED BOOST FOR ELIGIBLE USER EQUIPMENT ON A LOCAL AREA NETWORK," the disclosure of which is hereby incorporated herein by reference in its entirety.

BACKGROUND

A subscriber that obtains network access from an internet service provider (ISP) chooses a particular service tier that defines certain features, such as, for example, quality of service (QoS) features such as bandwidth. A customer premises equipment (CPE), such as a cable modem or Optical Network Unit (ONU), enforces the features associated with a particular subscriber.

SUMMARY

The embodiments disclosed herein implement provisioning a CPE with a differentiated feature for a user equipment (UE) that joins a local area network implemented by a router connected to a CPE provisioned for a default feature that is different (e.g. lower bandwidth) from the differentiated feature.

In one aspect, a method includes obtaining, by a computing system including one or more computing devices, data indicating a first user equipment (UE) has connected to a local area network (LAN) implemented by a router connected to a customer premises equipment (CPE) provisioned with a default feature associated with a first service tier of a plurality of different service tiers provided by an internet service provider. The method includes determining, by the computing system, the first UE is eligible for a second service tier of the plurality of different service tiers. In response to determining the first UE is eligible for the second service tier, the method includes causing, by the computing system, the CPE to be dynamically provisioned with a differentiated feature associated with the second service tier. The method includes sending, by the computing system, a message to the router to configure the router to provide the differentiated feature to the first UE.

In another aspect, a computing system includes one or more computing devices configured to obtain data indicating a first user equipment (UE) has connected to a local area network (LAN) implemented by a router connected to a customer premises equipment (CPE) provisioned with a default feature associated with a first service tier of a plurality of different service tiers provided by an internet service provider (ISP). The one or more computing devices are further configured to determine the first UE is eligible for a second service tier of the plurality of different service tiers provided by the ISP. In response to determining the first UE is eligible for the second service tier, the one or more computing devices are configured to cause the CPE to be dynamically provisioned with a differentiated feature associated with the second service tier. The one or more computing devices are further configured to send a message to the router to configure the router to facilitate providing the differentiated feature to the first UE.

In yet another aspect, a non-transitory computer-readable storage includes executable instructions to cause one or more processor devices to obtain data indicating a first user equipment (UE) has connected to a local area network (LAN) implemented by a router connected to a customer premises equipment (CPE) provisioned with a default feature associated with a first service tier of a plurality of different service tiers provided by an internet service provider (ISP). The executable instructions further cause the one or more processor devices to determine the first UE is eligible for a second service tier of the plurality of different service tiers provided by the ISP. In response to determining the first UE is eligible for the second service tier, the executable instructions further cause the one or more processor devices to cause the CPE to be dynamically provisioned with a differentiated feature associated with the second service tier. The executable instructions further cause the one or more processor devices to send a message to the router to configure the router to provide the differentiated feature to the first UE.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
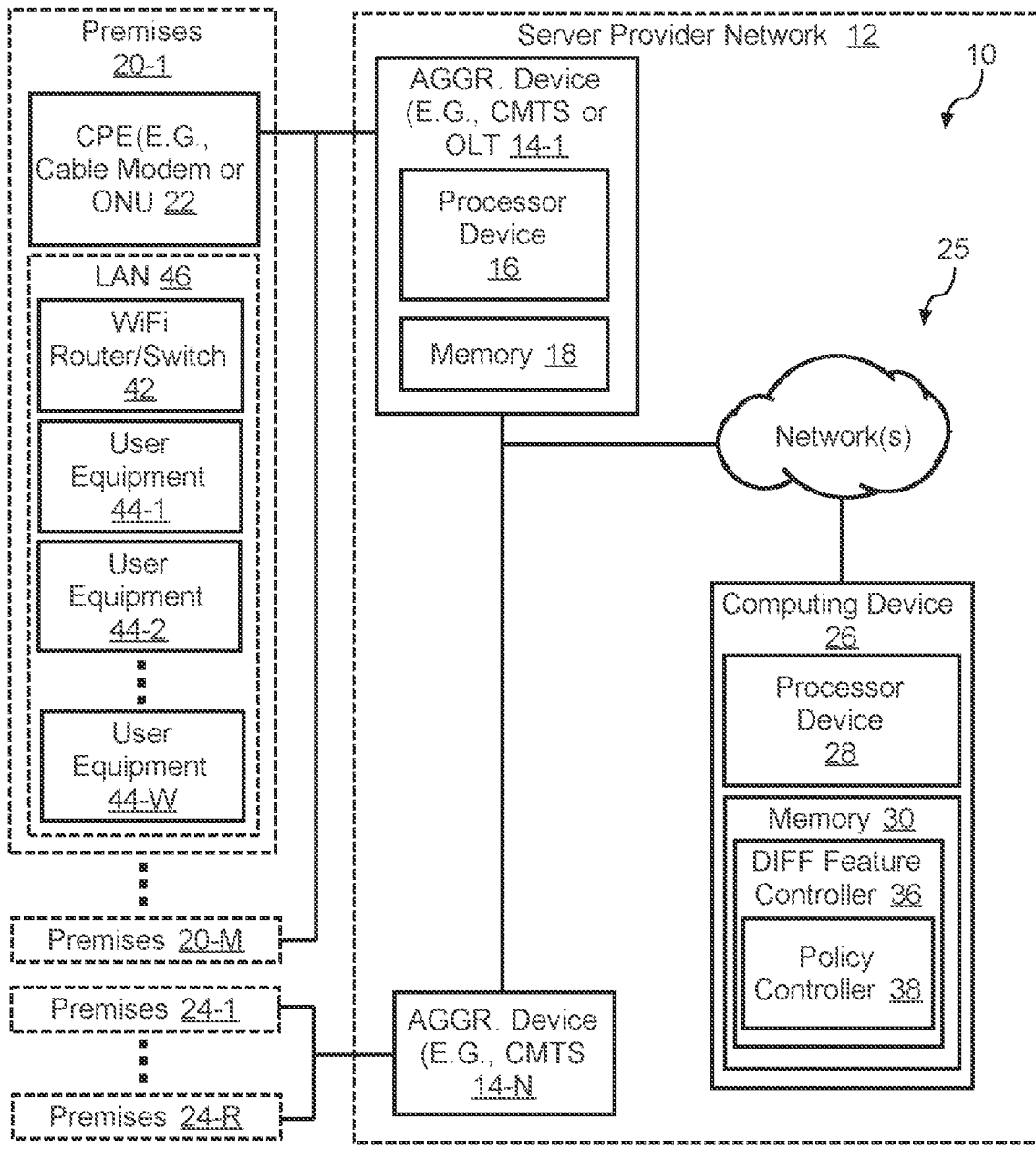
FIG. 1 is a block diagram of an environment in which a CPE may be dynamically provisioned with a differentiated feature for a UE that joined a LAN implemented by a router connected to the CPE according to some embodiments.

The embodiments set forth below represent the information to enable individuals to practice the embodiments and illustrate the best mode of practicing the embodiments. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

A subscriber (e.g., customer) that obtains network access from an internet service provider (ISP) can choose from among a plurality of different service tiers offered by the ISP. Each of the service tiers can have different quality of service (QoS) features, such as bandwidth. A customer premises equipment (CPE), such as a cable modem or optical network unit, can be provisioned according to the service tier subscribed to by the subscriber. The CPE can be connected to a router that implements a local area network (LAN) within the customer's premises (e.g., home).

In some embodiments, the CPE and the router can be implemented as separate devices and can be communicatively coupled to one another via a wired connection. In alternative embodiments, the CPE and the router can be implemented as an integrated CPE/router device, such as a modem router combo device. In such implementations, it should be understood that CPE hardware of the integrated CPE/router device is connected to router hardware of the integrated CPE/router device to allow user equipment (UE) connected to the LAN to obtain a connection to the Internet.

At times, a UE, such as a computing device, associated with a different subscriber of the ISP, can join the LAN. In some instances, the subscriber having the UE can be subscribed to a different service tier than the subscriber having the CPE. For example, the service tier subscribed to by the subscriber of the UE can have a higher bandwidth than the service tier subscribed to by the subscriber of the CPE.

The embodiments disclosed herein dynamically provision the CPE for two different service tiers, a first service tier subscribed to by the subscriber of the CPE and a second service tier subscribed to by the subscriber of the UE. Embodiments herein further disclose sending a message to the router to configure the router to facilitate providing the second service tier to the UE. More particularly, the router can provide the higher bandwidth service (e.g., second service tier) to the UE and the lower bandwidth service (e.g., first service tier) to any other UEs connected to the LAN and not eligible for the higher bandwidth service. In this manner, the subscriber of the UE can enjoy the same QoS features (e.g., higher bandwidth) of the second service tier despite being connected to the LAN of the subscriber subscribed to the first service tier having different QoS features (e.g., lower bandwidth).

As used herein, the term "user equipment" refers to computing devices that can connect to the LAN implemented by the router. Examples of user equipment can include, without limitation, mobile phones, tablets, laptops, gaming consoles, or any other suitable computing device capable of connecting to the LAN implemented by the router.

FIG. 1 is a block diagram of an environment 10 in which a CPE may be dynamically provisioned with a differentiated feature according to some embodiments. The environment 10 includes a service provider network 12 that includes a plurality of aggregation devices 14-1-14-N. The aggregation device 14-1 includes a processor device 16 and a memory 18, and provides services, such as, by way of non-limiting example, Internet access and/or voice services, to a plurality of premises 20-1-20-M.

The aggregation device 14-1 communicates with a customer premises equipment (CPE) 22 in the premises 20-1 via, for example, a coaxial cable or a fiber cable. The CPE 22 may comprise, for example, a cable modem or a fiber modem. The aggregation device 14 may include, for example, a cable modem termination system (CMTS) or a fiber aggregation system such as an Optical Line Terminal (OLT). For purposes of illustration only one CPE 22 is shown, however, in practice, the aggregation device 14-1 communicates with a CPE 22 located in each of the premises 20-1-20-M, and thus may be coupled to tens, hundreds or thousands of CPEs 22. The aggregation device 14-N similarly communicates with CPEs 22 located in premises 24-1-24-R.

The aggregation device 14-1 communicates with a computing system 25 that includes one or more computing devices 26 in the service provider network 12, each of which includes a processor device 28 and a memory 30. The computing device 26 includes a differentiated feature controller 36 that operates to implement differentiated features as will be described herein. The differentiated feature controller 36 includes a policy controller 38.

The CPE 22 may be communicatively coupled to a router 42. The router 42 is connected to a plurality of user equipment (UE) 44-1-44-W and implements a local area network (LAN) 46 in the premises 20-1. In some implementations, the LAN 46 can be an 802.11 network, such as a Wi-Fi network.

The policy controller 38 may determine that the CPE 22 is to be provisioned with a differentiated feature. This determination may be made, by way of non-limiting example, in response to a user request, in response to an operator request, in response to an occurrence of an event, such as a detection of a certain type of traffic being sent or received by the CPE 22, in response to the connection of a particular UE 44 to the router 42, or in response to any other suitable condition, criteria or event.

The term "differentiated feature" refers to a feature that was dynamically provisioned. The term "dynamically provisioned", as used herein, refers to modifying a feature of the CPE 22 without causing or requiring a reboot of the CPE 22. In particular, the CPE 22 may be dynamically provisioned with a feature via suitable instructions sent to the CPE 22 by the aggregation device 14-1. The particular instructions may differ depending on the manufacturer and/or model of the aggregation device 14-1 and the CPE 22. The term "feature" as used herein refers to parameters of the CPE 22 that cause the CPE 22 to process one or more packet flows in a particular manner, such as providing one or more packet flows with a particular bandwidth, providing a packet flow associated with a particular UE 44 a higher or lower priority than packet flows associated with other UEs 44, providing packet flows associated with a particular traffic type, such as video/voice traffic type, a higher priority than other packet flows, providing all packet flows a higher bandwidth than a default bandwidth, and the like. As another example, the CPE 22 may be dynamically provisioned with a differentiated QoS feature to provide the UE 44-1 a higher bandwidth than a default bandwidth of the CPE 22 due to a particular attribute of the UE 44-1.

In response to determining that the CPE 22 is to be dynamically provisioned with a differentiated feature, the policy controller 38 may send an instruction to the aggregation device 14-1 instructing the aggregation device 14-1 to send instructions to the CPE 22 to process one or more packet flows differently from how such packet flows would otherwise be processed in accordance with a default feature for the CPE. As an example, the policy controller 38 may send an instruction to the aggregation device 14-1 indicating that packet flows associated with the UE 44-1 are to be provided a greater bandwidth than a default bandwidth of the CPE 22. Alternatively, or additionally, the policy controller 38 may send an instruction to the aggregation device 14-1 indicating that packet flows associated within the UE 44-1 should have a higher priority than packet flows associated with other UEs connected to the local area network 46.

The differentiated feature may be temporary and end upon the occurrence of some event, such as a timer expiring, the UE 44-1 leaving the LAN 46, or upon the occurrence of any other suitable event. Upon the occurrence of such event, the policy controller 38 may send instructions to the aggregation device 14-1 that instructs the aggregation device 14-1 to remove the differentiated feature from the CPE 22.

It is noted that because the differentiated feature controller 36 is a component of the computing device 26, functionality implemented by the differentiated feature controller 36 may be attributed to the computing device 26 generally. Moreover, in examples where the differentiated feature controller 36 comprises software instructions that program the processor device 28 to carry out functionality discussed herein, functionality implemented by the differentiated feature controller 36 may be attributed herein to the processor device 28.

It is further noted that while the differentiated feature controller 36 is illustrated as having a single component, the differentiated feature controller 36 could be implemented in a greater number of components, and such components may be implemented on the same or separate computing devices 26.

Figure 2:
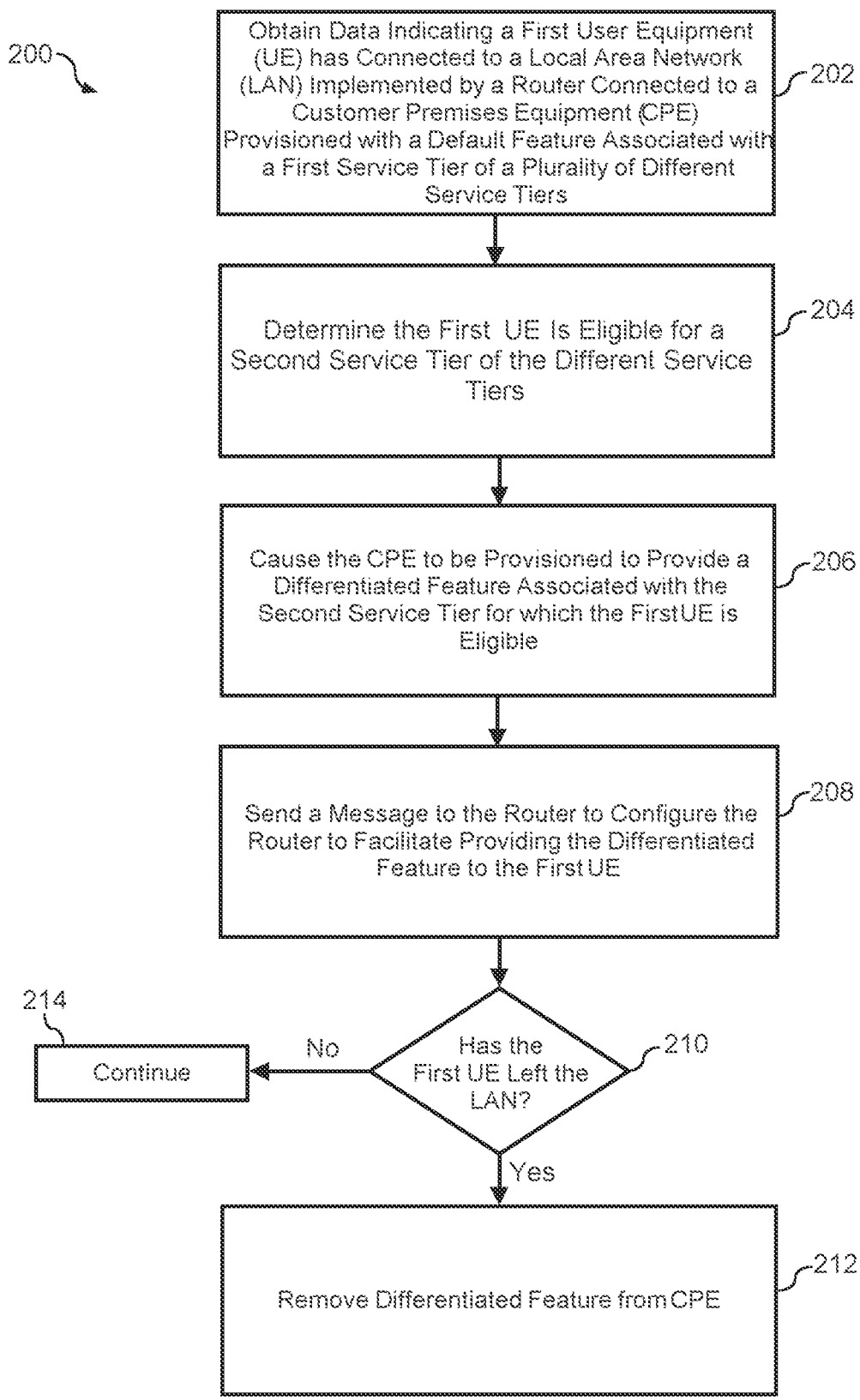
FIG. 2 is a flowchart of a method for dynamically provisioning a CPE with a differentiated feature for a UE that joined the LAN implemented by the router connected to the CPE according to some embodiments.

FIG. 2 is a flowchart of a method 200 for dynamically provisioning a CPE to provide a differentiated feature for a UE connected to router that is connected to the CPE and implementing a local network according to some embodiments. FIG. 2 will be discussed in conjunction with FIG. 1. FIG. 2 depicts steps performed in a particular order for purposes of illustration and discussion. Those of ordinary skill in the art, using the disclosure provided herein, will understand that various steps of the method 200 may be adapted, modified, rearranged, performed simultaneously, or modified in various ways without deviating from the scope of the present disclosure.

At (202), the method 200 includes obtaining, by the computing system 25, data indicating that UE 44-1 has connected to the LAN 46 implemented by the router 42 connected to the CPE 22 located on premises 20-1 and provisioned for a default feature (e.g., bandwidth) associated with a first service tier of a plurality of different service tiers provided by the internet service provider. For example, the data can include a join notification generated by the UE 44-1 in response to joining the LAN 46.

At (204), the method 200 includes determining, by the computing system 25, the UE 44-1 that connected to the LAN 46 at (202) is eligible for a service tier that is different from the first service tier for which the CPE 22 is currently provisioned. More specifically, the method 200 includes determining the UE 44-1 is eligible for the second service tier having a differentiated feature from the default feature of the first service tier for which the CPE 22 is currently provisioned. For example, the second service tier can have a higher bandwidth than the first service tier.

In some implementations, the policy controller 38 of the computing device 26 can determine eligibility of the UE 44-1 for the second service tier. For example, the data obtained at (202) can, in some instances, include information that can associate the UE 44-1 with a subscriber (e.g., customer) of the ISP. In this manner, the policy controller 38 can query a subscriber database to obtain account information for the subscriber. For example, the account information can indicate which of the plurality of service tiers the subscriber has a subscription plan for.

In some implementations, the method 200 can include determining whether the CPE 22 is capable of providing the differentiated feature to the UE 44-1. For example, the policy controller 38 can obtain information about the CPE 22. Examples of such information can include, without limitation, information indicative of hardware and software implemented by the CPE 22. For example, the policy controller 38 can be configured to obtain information about a version of the firmware currently installed on the CPE 22. It should be understood that the policy controller 38 can determine whether the CPE 22 has hardware/software capabilities needed to provide the differentiated feature to the UE 44-1.

At (206), the method 200 can include causing the CPE 22 to be dynamically provisioned to provide the differentiated feature associated with the second service tier for which the UE 44-1 was determined to be eligible at (204). For instance, in some implementations, the policy controller 38 can be configured to send an instruction to the aggregation device 14-1 to instruct the aggregation device to dynamically provision the CPE 22 with the differentiated feature associated with the second service tier of service.

At (208), the method 200 includes sending a message to the router 42 to configure the router 42 to facilitate providing the differentiated feature to the UE 44-1. More particularly, the router 42 can be configured to communicate with the UE 44-1 separately from any other UEs 44-2-44-W connected to the LAN 46. For instance, a first range of virtual ports (e.g., Network Address Translation (NAT) ports) of the router 42 can be configured for communications with the UE 44-1 and a second range of virtual ports (e.g., NAT ports) on the router 42 can be configured for communications with any other UEs 44-2-44-W connected to the LAN 46. In this manner, the differentiated feature (e.g., higher bandwidth) can be provided to the UE 44-1 and the default feature (e.g., lower bandwidth) can be provided to any other UEs 44-2-44-W connected to the LAN 46 that are not eligible for the second service tier and therefore cannot receive the differentiated feature (e.g., higher bandwidth) being provided to the UE 44-1. For instance, the default feature can be provided to the second UE 44-2 that is connected to the LAN 46 and is not eligible for the second service tier.

At (210), the method 200 includes determining whether the UE 44-1 is still connected to the LAN 46. If the computing system 25 determines the UE 44-1 is no longer connected to the LAN 46, the method 200 proceeds to (212). Otherwise, the method 200 proceeds to (214). It should be understood that the computing system 25 can determine the UE 44-1 is no longer connected to the LAN 46 in any suitable manner. For instance, in some implementations, the computing system 25 can receive a notification from the router 42 if a predetermined amount of time has lapsed since the router 42 last received a communication from the UE 44-1.

At (212), the method 200 includes causing, by the computing system 25, the differentiated feature to be removed from the CPE 22. For instance, the policy controller 38 can send instructions to the aggregation device 14-1 to remove the differentiated feature from the CPE 22.

At (214), the method 200 can continue. For instance, in some implementations, the computing system 25 can periodically check to see if the UE 44-1 has left the LAN 46. In this manner, the computing system 25 can monitor the LAN 46 and can determine when the UE 44-1 leaves the LAN 46 and take the necessary steps to remove the differentiated feature from the CPE 22 and the aggregation device 14-1 as discussed above at (212).

Although the method 200 was discussed with reference to a single UE 44-1 joining the LAN 46 that are eligible for the higher bandwidth service (e.g. second service tier), it should be understood that the scope of the present disclosure is intended to cover implementations in which multiple UEs 44 that are eligible for the higher bandwidth service connect to the LAN 46. In some implementations, the higher bandwidth service can be shared amongst the multiple UEs 44. In alternative implementations, the CPE 22, the router 42, or both can be configured so that the multiple UEs do not have to share the higher bandwidth service.

Figure 3A:
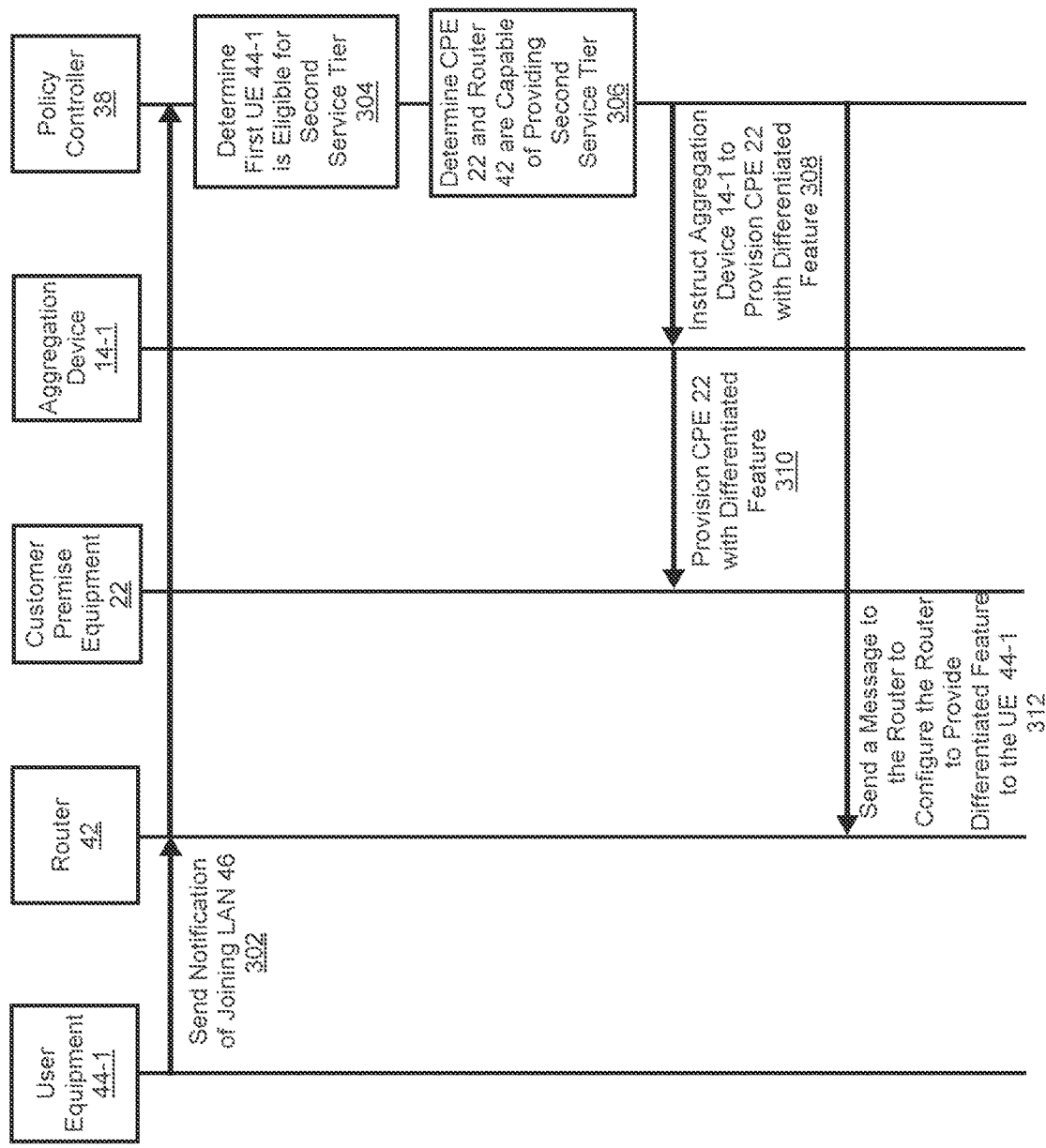
FIGS. 3A and 3B are sequence diagrams that illustrate messages communicated between and actions taken by various components illustrated in FIG. 1 to dynamically provision a CPE with a differentiated feature for a UE that joined the LAN implemented by the router connected to the CPE according to some embodiments.
Figure 3B:
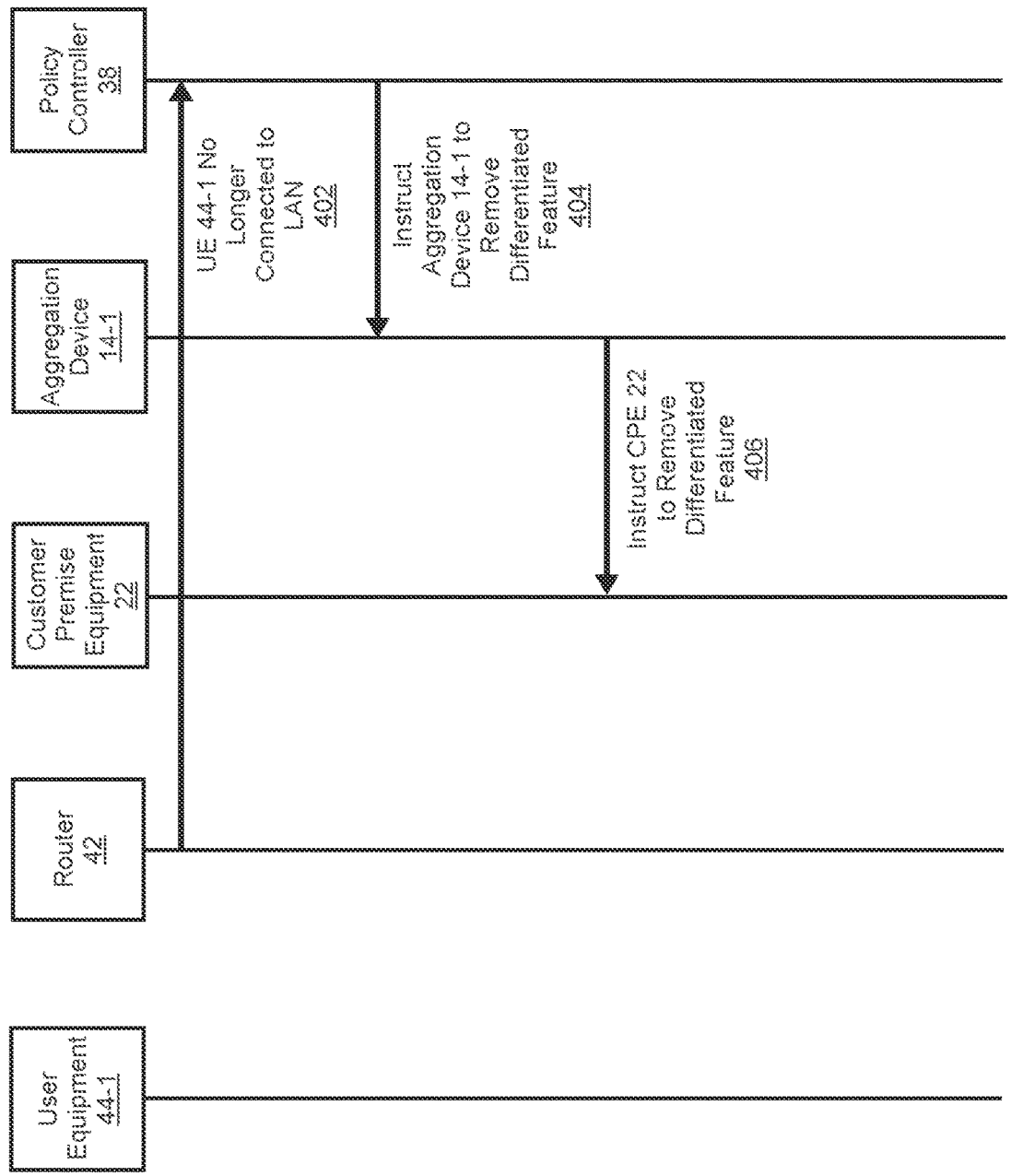

FIGS. 3A and 3B are sequence diagrams that illustrate messages communicated between and actions taken by various components illustrated in FIG. 1 to dynamically provision the CPE 22 for a differentiated feature while the UE 44-1 eligible for a higher bandwidth service is connected to the LAN 46 implemented by the router 42 connected to the CPE 22. Referring first to FIG. 3A, the UE 44-1 sends data (e.g., notification) indicative of the UE 44-1 joining the LAN 46 (step 302). More specifically, the UE 44-1 sends the data to the router 42 and the router 42 forwards the data to the policy controller 38 of the computing device 26. Upon receiving the data indicating the UE 44-1 joined the LAN 46, the policy controller 38 determines the UE 44-1 is eligible for the second service tier that is different from the first service tier for which the CPE 22 is currently provisioned (step 304). Furthermore, in some implementations, the policy controller 38 determines the CPE 22 is capable of providing the second service tier to the UE 44-1 (step 306).

The policy controller 38 causes the CPE 22 to be provisioned for a differentiated feature that is associated with the second service tier for which the UE 44-1 is eligible and is different from the default feature associated with the first service tier for which the CPE 22 is currently provisioned. For instance, the policy controller 38 can instruct the aggregation device 14-1 to dynamically provision the CPE 22 for the differentiated feature associated with the second service tier (step 308). Upon receiving the instruction from the policy controller 38, the aggregation device 14-1 can dynamically provision the CPE 22 with the differentiated feature (step 310). At this point, the CPE 22 can provide the default feature associated with the first service tier for which the CPE 22 was initially provisioned as well as the differentiated feature associated with the second service tier for which the CPE 22 is dynamically provisioned.

The policy controller 38 can send a message to the router 42 to configure the router 42 to facilitate providing the second service tier to the UE 44-1 (step 312). For instance, the message can instruct the router 42 to communicate with the UE 44-1 via the first range of virtual ports to provide the second service tier to the UE 44-1. It should be understood that the router 42 can provide the first service tier to other UEs 44-2-44-W via the second range of virtual ports that are different from the first range of virtual ports used to provide second service tier. In this manner, the router 42 can provide the differentiated feature (e.g., higher bandwidth) to the UE 44-1 and the default feature (e.g., lower bandwidth) to UEs-44-2-44-W.

FIG. 3B depicts the messages communicated between and actions taken by various components illustrated in FIG. 1 when the UE 44-1 eligible for the second service tier disconnects from the LAN 46. For example, the router 42 can communicate a message to the policy controller 38 to indicate the UE 44-1 has dropped off the LAN 46 after a predetermined amount of time lapses without the router 42 and/or the CPE 22 receiving a communication (e.g., ping) from the UE 44-1 (step 402). Upon receiving the message from the router 42, the policy controller 38 can instruct the aggregation device 14-1 to remove the differentiated feature from the CPE 22 (step 404). Upon receiving the instruction from the policy controller 38, the aggregation device 14-1 can remove the differentiated feature from the CPE 22 (step 406).

Figure 4:
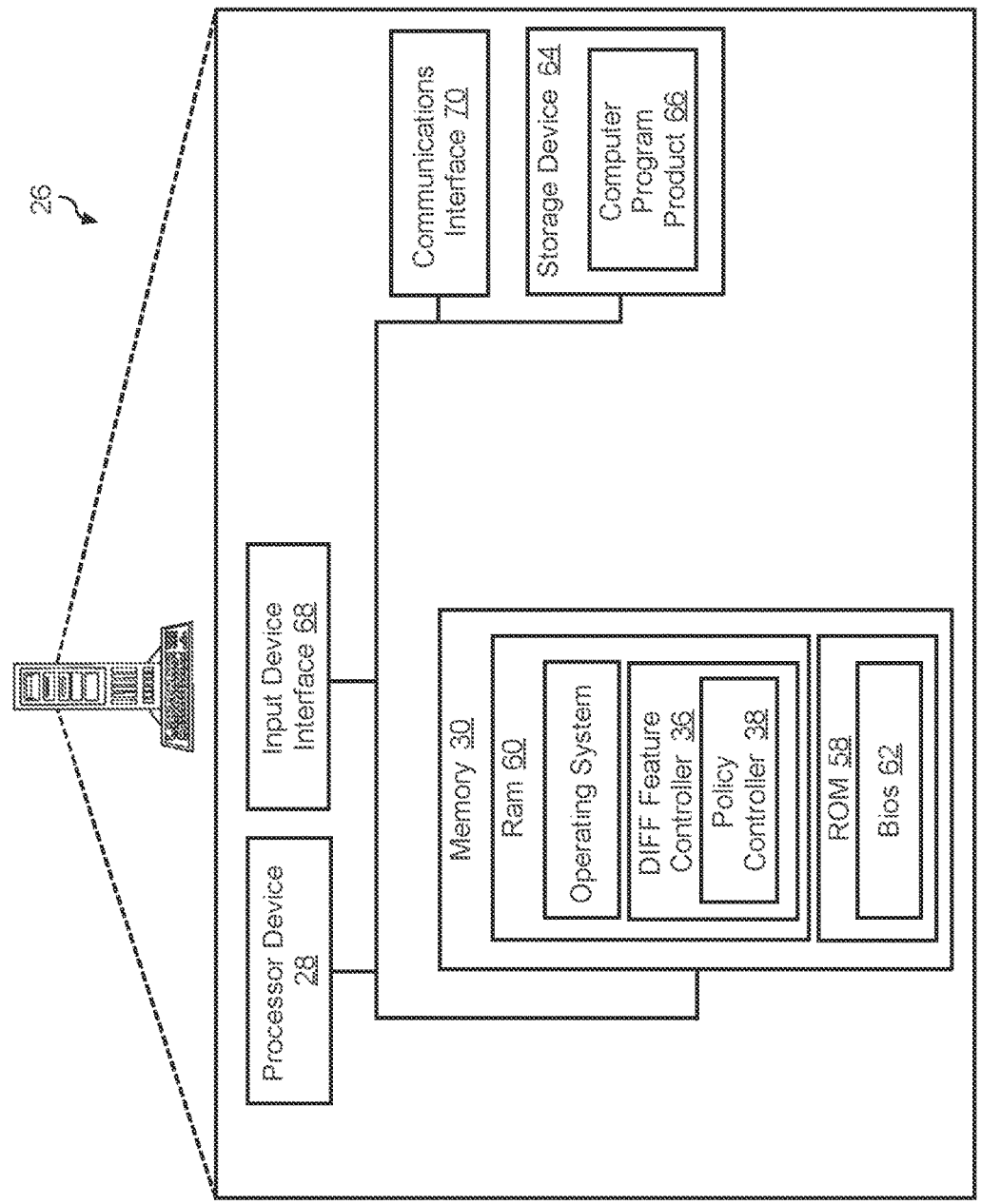
FIG. 4 is a block diagram of a computing device suitable for implementing the embodiments disclosed herein.

FIG. 4 is a block diagram of the computing device 26 suitable for implementing the embodiments disclosed herein. The computing device 26 may comprise any computing or electronic device capable of including firmware, hardware, and/or executing software instructions to implement the functionality described herein, such as a computer server, or the like. The computing device 26-S includes the processor device 28, the memory 30, and a system bus 56. The system bus 56 provides an interface for system components including, but not limited to, the memory 30 and the processor device 28. The processor device 28 can be any commercially available or proprietary processor.

The system bus 56 may be any of several types of bus structures that may further interconnect to a memory bus (with or without a memory controller), a peripheral bus, and/or a local bus using any of a variety of commercially available bus architectures. The memory 30 may include non-volatile memory 58 (e.g., read-only memory (ROM), erasable programmable read-only memory (EPROM), electrically erasable programmable read-only memory (EEPROM), etc.), and volatile memory 60 (e.g., random-access memory (RAM)). A basic input/output system (BIOS) 62 may be stored in the non-volatile memory 58 and can include the basic routines that help to transfer information between elements within the computing device 26. The volatile memory 60 may also include a high-speed RAM, such as static RAM, for caching data.

The computing device 26 may further include or be coupled to a non-transitory computer-readable storage medium such as a storage device 64, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 64 and other drives associated with computer-readable media and computer-usable media may provide non-volatile storage of data, data structures, computer-executable instructions, and the like.

A number of modules can be stored in the storage device 64 and in the volatile memory 60, including an operating system and one or more program modules, such as the differentiated feature controller 36, which may implement the functionality described herein in whole or in part. All or a portion of the examples may be implemented as a computer program product 66 stored on a transitory or non-transitory computer-usable or computer-readable storage medium, such as the storage device 64, which includes complex programming instructions, such as complex computer-readable program code, to cause the processor device 28 to carry out the steps described herein. Thus, the computer-readable program code can comprise software instructions for implementing the functionality of the examples described herein when executed on the processor device 28. The processor device 28, in conjunction with the differentiated feature controller 36 in the volatile memory 60, may serve as a controller, or control system, for the computing device 26 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 28 through an input device interface 68 that is coupled to the system bus 56 but can be connected by other interfaces such as a parallel port, an Institute of Electrical and Electronic Engineers (IEEE) 1394 serial port, a Universal Serial Bus (USB) port, an IR interface, and the like. The computing device 26 may also include a communications interface 70 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:
   obtaining, by a router, data indicating that a first user equipment (UE) is connecting to a local area network (LAN) implemented by the router, the router connected to a customer premises equipment (CPE) provisioned with a default feature associated with a first service tier of a plurality of different service tiers provided by an internet service provider (ISP);
   receiving, by the router, a message indicating that the first UE is eligible for a differentiated feature associated with a second service tier of the plurality of different service tiers provided by the ISP; and
   responsive to receiving the message, providing, by the router, the differentiated feature to the first UE.

2. The method of claim 1, wherein the default feature and the differentiated feature comprise a bandwidth feature.

3. The method of claim 2, wherein a bandwidth of the second service tier is higher than a bandwidth of the first service tier.

4. The method of claim 1, wherein the router is configured to communicate with the first UE separately from other UEs of a plurality of UEs connected to the LAN.

5. The method of claim 4, wherein a first range of virtual ports of the router are configured for communications with the first UE and a second range of virtual ports of the router are configured for communications with the other UEs of the plurality of UEs connected to the LAN.

6. The method of claim 5, wherein the message comprises instructions for the router to communicate with the first UE via the first range of virtual ports of the router to provide the differentiated feature to the first UE.

7. The method of claim 1, wherein the router is configured to provide the default feature to a second UE connected to the LAN.

8. The method of claim 7, wherein the router is connected to a plurality of UEs, wherein the first UE and the second UE are selected from the plurality of UEs.

9. The method of claim 7, further comprising:
   responsive to receiving the message, providing, by the router, the default feature to the second UE and a plurality of UEs not including the first UE.

10. The method of claim 9, wherein providing, by the router, the default feature to the second UE and the plurality of UEs not including the first UE comprises providing the default feature via a range of virtual ports separate from a range of virtual ports used to provide the differentiated feature to the first UE.

11. The method of claim 1, further comprising:
    determining, by the router, that a predetermined amount of time has lapsed since the router last received a communication from the first UE; and
    sending, by the router, a notification to a computing system, the notification indicating that the predetermined amount of time has lapsed since the router last received a communication from the first UE.

12. The method of claim 1, further comprising:
    determining, by the router, that a predetermined amount of time has lapsed since the router last received a communication from the first UE; and
    sending, by the router to a computing device, a message indicating that the first UE has dropped off the LAN.

13. The method of claim 1, wherein the LAN is an 802.11 network.

14. The method of claim 1, wherein the CPE is provisioned with the differentiated feature.

15. The method of claim 1, wherein the CPE comprises a cable modem.

16. A computing system comprising:
    a router device configured to:
    obtain data indicating that a first user equipment (UE) is connecting to a local area network (LAN) implemented by the router device, the router device connected to a customer premises equipment (CPE) provisioned with a default feature associated with a first service tier of a plurality of different service tiers provided by an internet service provider (ISP);
    receive a message indicating that the first UE is eligible for a differentiated feature associated with a second service tier of the plurality of different service tiers provided by the ISP; and
    responsive to receiving the message, provide the differentiated feature to the first UE.

17. The computing system of claim 16, wherein the router device is further configured to provide the default feature to a second UE connected to the LAN.

18. The computing system of claim 16, wherein the router device is further configured to:
    determine that a predetermined amount of time has lapsed since the router device last received a communication from the first UE; and
    send a notification to a computing system, the notification indicating that the predetermined amount of time has lapsed since the router device last received a communication from the first UE.

19. The computing system of claim 16, wherein the router device is further configured to:
    determine that a predetermined amount of time has lapsed since the router device last received a communication from the first UE; and
    send, to a computing device, a message indicating that the first UE has dropped off the LAN.

20. A non-transitory computer-readable storage medium that includes executable instructions to cause one or more computing devices to:

obtain data indicating that a first user equipment (UE) is connecting to a local area network (LAN) implemented by a router, the router connected to a customer premises equipment (CPE) provisioned with a default feature associated with a first service tier of a plurality of different service tiers provided by an internet service provider (ISP);

receive a message indicating that the first UE is eligible for a differentiated feature associated with a second service tier of the plurality of different service tiers provided by the ISP; and responsive to receiving the message, provide the differentiated feature to the first UE.

\* \* \* \* \*